(12) United States Patent
Gaynes et al.

(10) Patent No.: US 6,174,406 B1
(45) Date of Patent: Jan. 16, 2001

(54) BONDING TOGETHER SURFACES

(75) Inventors: Michael A. Gaynes, Vestal; Ramesh R. Kodnani, Binghamton, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/057,630

(22) Filed: Apr. 9, 1998

(51) Int. Cl.⁷ .................................................. B32B 31/00
(52) U.S. Cl. ................................................ 156/295
(58) Field of Search ........................... 156/295, 291, 156/292

(56) References Cited

U.S. PATENT DOCUMENTS

| | | |
|---|---|---|
| 3,861,783 | 1/1975 | Dill et al. . |
| 4,803,124 * | 2/1989 | Kunz .................... 156/295 |
| 4,832,457 | 5/1989 | Saitoh et al. . |
| 5,106,197 | 4/1992 | Ohuchida et al. ............. 359/83 |
| 5,187,123 * | 2/1993 | Yoshida ..................... 156/295 |
| 5,246,764 | 9/1993 | LaPorte et al. ............. 428/195 |
| 5,346,569 | 9/1994 | Simon ........................ 156/87 |
| 5,399,220 | 3/1995 | Winslow . |
| 5,423,889 * | 6/1995 | Colquitt ..................... 156/295 |
| 5,626,809 | 5/1997 | Mortelmans ................ 264/167 |
| 5,804,026 * | 9/1998 | Vogt .......................... 156/295 |

FOREIGN PATENT DOCUMENTS

| | | |
|---|---|---|
| 56-65598 | 6/1981 | (JP) . |
| 58-179282 | 10/1983 | (JP) . |

OTHER PUBLICATIONS

Denk, "Dry Printing of Adhesive Patterns", *IBM Technical Disclosure Bulletin*, vol. No. 11, Apr. 1970, p. 1844.
Magno et al., "Adhesive Applicator", *IBM Technical Disclosure Bulletin*, vol. 19, No. 3, Aug. 1976, pp. 782–783.

* cited by examiner

Primary Examiner—Michael W. Ball
Assistant Examiner—Michael A Tolin
(74) Attorney, Agent, or Firm—Pollack, Vande Sande & Amernick; Lawrence R. Fraley

(57) ABSTRACT

Two surfaces are adhesively bonded together by providing on one of the surfaces a central, single point adhesive contact deposit and providing on one of the surfaces, adhesive extending from a central point deposit in a spoke-like array diagonally across substantially the entire surface. Also provided is the article obtained by the above method as well as the assembly used for bonding the two surfaces together. The surfaces are brought together, one on top of the other, with the adhesive located between the surfaces to cause the adhesive to spread out and cover the surfaces to thereby bond them together.

13 Claims, 1 Drawing Sheet

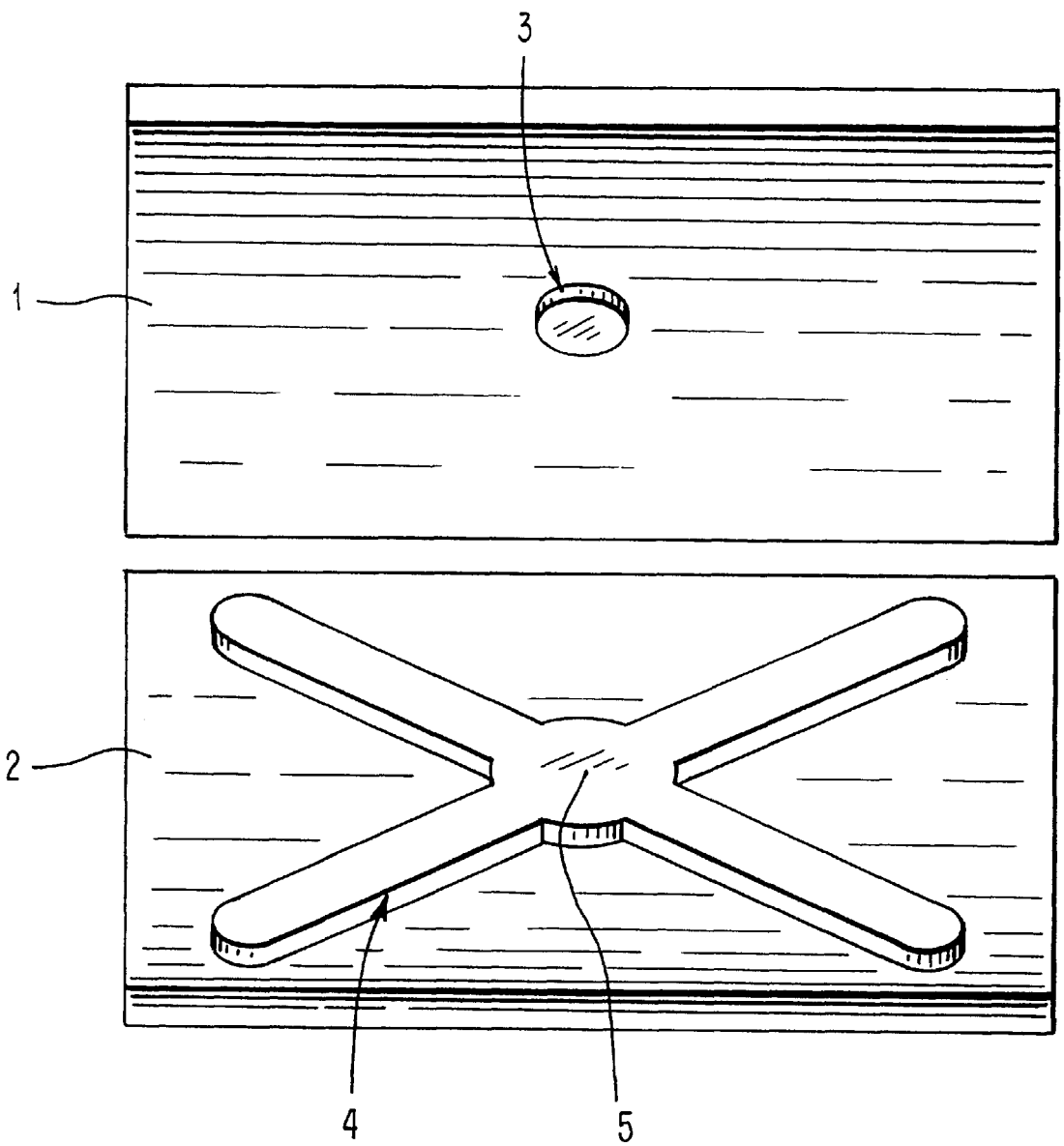

BONDING TOGETHER SURFACES

TECHNICAL FIELD

The present invention is concerned with a method for adhesively bonding two surfaces together with a liquid adhesive and particularly is concerned with significantly reducing, if not entirely eliminating, air entrapment in the bond. In addition, the present invention is directed to an assembly for bonding two surfaces together as well as directed to the bonded surfaces obtained according to the present invention. The present invention is especially applicable for binding flat or at least substantially planar surfaces such as used for fabricating microelectronic components such as liquid crystal display assemblies and heat-sink attachments as well as various commercial applications such as windowpane glass and auto windshield applications.

BACKGROUND OF INVENTION

A variety of industrial and commercial applications require bonding surfaces together and, in certain instances, flat surfaces having relatively large areas. Included in these applications are microelectronics applications for bonding liquid crystal display assemblies and especially relatively large liquid crystal display assemblies and heat-sink attachments, and such commercial applications as windowpane glass and auto windshield applications. When laminating or bonding flat surfaces with a liquid adhesive, the ever present problem of air entrapment requires special attention. For instance, even though a surface may appear flat or planar, small topographic variations allow contacting at multiple points during mating. As the adhesive spreads from such multiple points, the advancing fronts can meet and thereby trap pockets of air.

The larger the area of the mating surface, the higher the incidence of air entrapment. Furthermore, the lower the viscosity of the adhesive, the higher the incidence of air entrapment.

Trapped air, depending upon the desired product, presents problems of varying degrees. For instance, when dealing with bonding large liquid crystal display assemblies, the individual LCD tiles are arranged in a matrix and secured to a tile carrier. The tile carrier typically includes a cover plate and a back plate with the LCD tiles sandwiched between them. The bonding of the back plate and cover plate to the liquid crystal display tiles should be as void free as possible. In order to achieve a void free bond, proper dispensing of the adhesive mass along with providing a pattern that allows spreading out from the center outward and sweeping air out as the front advances must be achieved. In addition, the surfaces to be bonded must be mated parallel to each other. It is also desirable that the point contact of the mating surfaces with the adhesive between them be controlled and that the pattern employed permit complete coverage of the surface area of the mating substrates regardless of shape such as rectangular, square or polygon. Also, it is necessary to control the bond line.

With respect to these requirements, the proper dispensing of the adhesive mass can be readily achieved employing metered dispense units well known in the art. Moreover, it has previously been determined that an X pattern extending the entire diagonal length of the surfaces to be bonded is necessary for achieving complete coverage. Furthermore, a majority of the adhesive should be dispensed in the center of the adhesive pattern since spreading is initiated in the center, and spreads out radially. Nevertheless, it has been found that regardless of the pattern geometry in the center, e.g. circular, elliptical, square, smaller scale X pattern and the like, the geometry of the spreading area quickly reverts to circular or elliptical. However, even when employing an X pattern with the diagonal spokes extending all the way to the corners of the surface to be bonded, a void free bond line is not necessarily achieved.

SUMMARY OF INVENTION

The present invention is concerned with substantially eliminating, if not entirely eliminating, voids when bonding surfaces together and especially flat surfaces. In particular, the present invention is concerned with a method for bonding two flat planar surfaces together. The method of the present invention comprises providing on a major surface of one of the surfaces to be bonded a central single point adhesive contact deposit within the vicinity of the center of the surface. Also provided on a major surface of one of the surfaces is adhesive arranged and extending from a central portion deposit in a spoke-like array diagonally across substantially the entire surface. The two surfaces are mated parallel to each other with the adhesive located between the two surfaces and pressed together to thereby cause the adhesive to spread and cover the surfaces and thereby bond the surfaces together.

The present invention is also concerned with an assembly for bonding two surfaces together which comprises central single point adhesive contact deposit present within the vicinity of the center of one of the surfaces. Also provided on a major surface of one of the surfaces is adhesive arranged and extending from a central portion deposit in a spoke-like array diagonally across substantially the entire surface.

Furthermore, the present invention is concerned with an article that comprises two surfaces bonded together wherein one of the surfaces has a smaller surface area than that of the other of the surfaces. The surfaces are bonded together by an adhesive located between the surfaces and covering the entire area of the smaller surface area and being void free and exhibiting a wavelike undulating fillet profile on the outer perimeter of the smaller surface.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

SUMMARY OF DRAWING

The FIGURE illustrates two surfaces to be bonded in unassembled form according to one embodiment of the present invention.

BEST AND VARIOUS MODES FOR CARRYING OUT INVENTION

Reference to the FIGURE will be made to help facilitate an understanding of the present invention.

The present invention is concerned with bonding together two surfaces and to achieve a void free bond between the two surfaces. The surfaces 1 and 2 bonded together according to the present invention preferably exhibit flat or planar profile and include various glass substrates, ceramic substrates and metal surfaces. A particular example is the cover and back glass plate used for fabricating liquid crystal display assemblies including relatively large liquid crystal display assemblies including those having dimensions of at least 91"×12". It is understood that a "flat" or "planar" surface as used in describing the present invention refers to surfaces that can include small topographic variations such as those inevitably present from various manufacturing methods.

It has been found, according to the present invention, that in order to achieve a void free bond, a central, single point adhesive contact 3 must be provided. According to the present invention, this single point contact 3 can be achieved by depositing a dot-like substantially hemispherical shaped adhesive deposit within the vicinity of the center of one of the surfaces to be bonded. In the case of the adhesive having a viscosity of less than about 30,000 centipoise, cps, it is preferred that the deposit be placed on that substrate used as the top substrate when bringing together the two surfaces during the bonding procedure. In this case, after being applied to surface 1, the deposit 3 due to its flow characteristics may take on a form generally resembling a Hershey Kiss®. In that manner, the downward forces tend to facilitate forming such a shaped adhesive deposit. Using an adhesive having a viscosity less than about 30,000 centipoise on the surface to be used as the bottom surface when the two surfaces are brought together will tend to cause it to self-level and not be able to maintain the necessary single point contact. On the other hand, when the adhesive employed has a viscosity of greater than 30,000 centipoise, the dot-like generally hemispherical shaped adhesive deposit 3 can be placed on the flat surface of the substrate that will be placed as the bottom or top substrate when the two surfaces are brought together during the bonding process. When located on the bottom substrate, the height of the single point contact deposit 3 will need to be greater than that of the remainder of the adhesive array 4.

The central single point adhesive contact typically has a diameter of about 30 mils to about ¼" and more typically about 60 to about 100 mils. The height is typically about ½ of the diameter and usually ranges from about 15 mils to about ⅛".

It is also necessary, according to the present invention, that on a major surface of one of the surfaces there is provided an adhesive 4 that extends outward from a central point deposit 5 in a spoke-like array diagonally across substantially the entire surface. The diameter of the central point deposit 5 is at least as great as the diameter of the single point adhesive contact in order to receive or contact the single point adhesive contact during the bonding process. The deposit 5 is typically about 5% to about 50% and more typically about 5 to about 15% of the surface 2 to be bonded. According to preferred aspects, the spoke-like array resembles an X pattern across the surface. According to preferred aspects of the present invention, at least four diagonal spokes emanating from the center are provided. Also, if desired, additional adhesive deposits can likewise be provided, typically up to about an additional four spoke-like deposits. It is desired that the individual spokes be substantially equidistant from adjacent deposits and generally have a height or thickness of about 2 to about 50 mils. Every spoke-like deposit in the array should have substantially the same height.

The adhesives employed are preferably thermosetting adhesives and most preferably curable with actinic light such as UV light. The adhesive composition for the central single point adhesive contact can be the same adhesive as employed for the spoke-like pattern but does not necessarily need to be the same exact composition. However, the two adhesives need to be compatible with each other. Typical adhesives are acrylic adhesives, silicones and urethane acrylates and preferably have viscosity of about 1000 cps or less. One such commercially available urethane acrylate adhesive is Luxtrak 4031 from Abelstik Labs. Other suitable adhesives include Luxtrak 4170 from Abelstik Labs, a urethane acrylate, Luxtrak 4116 from Abelstik Labs, a urethane acrylate, VLC701 from Glotrax, Inc., a urethane acrylate and X3-6211 from Dow Corning, a polydimethylsiloxane.

The adhesive array, having a viscosity of 1000 cps, is typically dispensed on a surface of the substrate that is to be used as the bottom substrate during the bonding process.

The surfaces 1 and 2 to be bonded are then placed on top of each other and are mated parallel to each other with the adhesive between the surfaces and slowly brought together. The mating process, for example with 9"×12" glass substrates, typically takes about 1 to about 4 minutes. As the surfaces are mated to each other, the adhesive beginning from the center begins to flow out radially until it reaches the edge of the surfaces being the same size, once the adhesive reaches the edge and goes beyond it may be desirable to remove any excess adhesive around the edges. On the other hand, when one of the surfaces is of a smaller size than the other, the material once it reaches the edge exhibits a wavy fillet front on the outer perimeter of the small surface. In the case of different size surfaces, the adhesive pattern is provided so that it only covers the smaller of the surfaces.

The following non-limiting example is illustrated to further illustrate the present invention.

EXAMPLE

In this example a backplate 9½"×12½" is adhesively bonded to a 9"×12" liquid crystal display (LCD) with a 2 mil thick clear adhesive.

A UV light curing adhesive from Ablestik Labs (Luxtrak 4031), having a viscosity of 1000 cps, is dispensed on the backplate (the bottom surface) in an X pattern with additional adhesive dispensed in the center, as shown in the figure. The majority of the adhesive dispensed in the center starts to spread and self-level due to its low viscosity. The thickness of the adhesive on the backplate is approximately 40–50 mils in the center and approximately 30–40 mils in the spokes of the X pattern. A hemispherical dot (mass) of the same adhesive is dispensed at or near the center of the LCD (the top surface) as shown in the figure. This adhesive dot, also referred to as the seed dot, is approximately 100 mils in diameter, and 50 mils in height. These two surfaces to be bonded are now aligned (optically) and moved close to each other vertically. As the two surfaces come close, the adhesive between the two surfaces makes a point contact in the center, and spreads out radially, sweeping the air out between the surfaces. The speed of vertical travel of the surfaces is slow enough to provide enough time for the adhesive to flow and cover the entire surfaces. Once the desired adhesive thickness is achieved, the bonded parts are exposed to a UV light which cures the adhesive between the two surfaces, bonding them together.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for adhesively bonding two flat surfaces together which comprises: providing on one of said surfaces a central single point adhesive contact deposit;

providing on one of said surfaces adhesive extending outward from a central portion deposit in a spoke array diagonally across substantially the entire surface;

bringing together said two surfaces, one on top of the other, with the surface containing the central single point adhesive contact deposit thereon being the top one of the two surfaces during the bringing together of the two surfaces and with the adhesive located between said surfaces to cause said adhesive to spread out and cover said surfaces to thereby bond them together;

wherein said central single point adhesive contact deposit is a generally hemispherically dot shaped adhesive deposit; and wherein the central single point adhesive contact is located on one of the surfaces and the central portion deposit on the other surface.

2. The method of claim 1 wherein said adhesive has a viscosity of greater than 30,000 centipoise.

3. The method of claim 1 wherein said adhesive has a viscosity of less than 30,000 centipoise; and said central portion deposit has a diameter at least as large as the diameter of said single point adhesive contact deposit for contacting with said single point adhesive contact deposit during bonding.

4. The method of claim 1 wherein said flat surfaces are glass.

5. The method of claim 1 wherein said flat surfaces are glass panels for fabricating liquid crystal display assemblies.

6. The method of claim 1 wherein one of the surfaces has a smaller area than the other of the surfaces.

7. The method of claim 1 wherein the adhesive is a thermosetting adhesive.

8. The method of claim 1 wherein said spoke-like array comprises at least four spoke adhesive deposits.

9. The method of claim 1 wherein said spoke-like array comprises up to eight spoke adhesive deposits.

10. The method of claim 1 wherein each of said spoke deposits is about 2 to about 50 mils thick.

11. The method of claim 1 wherein said central single paint adhesive contact deposit has a diameter of about 30 mils to about ¼" and a height about 15 mils to about ⅛".

12. The method of claim 11 wherein said generally hemispherical dot-shaped adhesive deposit has a diameter of about 60 to about 100 mils and a height of about 30 to about 50 mils.

13. The method of claim 11 wherein the height of the spoke-like deposits is about 2 to about 50 mils.

* * * * *

UNITED STATES PATENT AND TRADEMARK OFFICE
CERTIFICATE OF CORRECTION

PATENT NO.    : 6,174,406 B1
DATED         : January 16, 2001
INVENTOR(S)   : Michael A. Gaynes, Ramesh R. Kodnani It is certified that error appears in the above-identified patent and that said Letters Patent is hereby corrected as shown below:

Title page,
Item [56], under OTHER PUBLICATIONS, please insert -- 12 -- on the second line after vol.

Column 6, claim 11,
Line 25, please insert -- of -- after height.

Signed and Sealed this

Second Day of October, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,174,406 B1
DATED : January 16, 2001
INVENTOR(S) : Gaynes et al.

It is certified that error appears in the above-identified patent and that said Letters Patent is hereby corrected as shown below:

Column 6,
Line 24, replace "paint" with -- point --.

Signed and Sealed this

Twelfth Day of October, 2004

JON W. DUDAS
*Director of the United States Patent and Trademark Office*